Patented Feb. 5, 1935

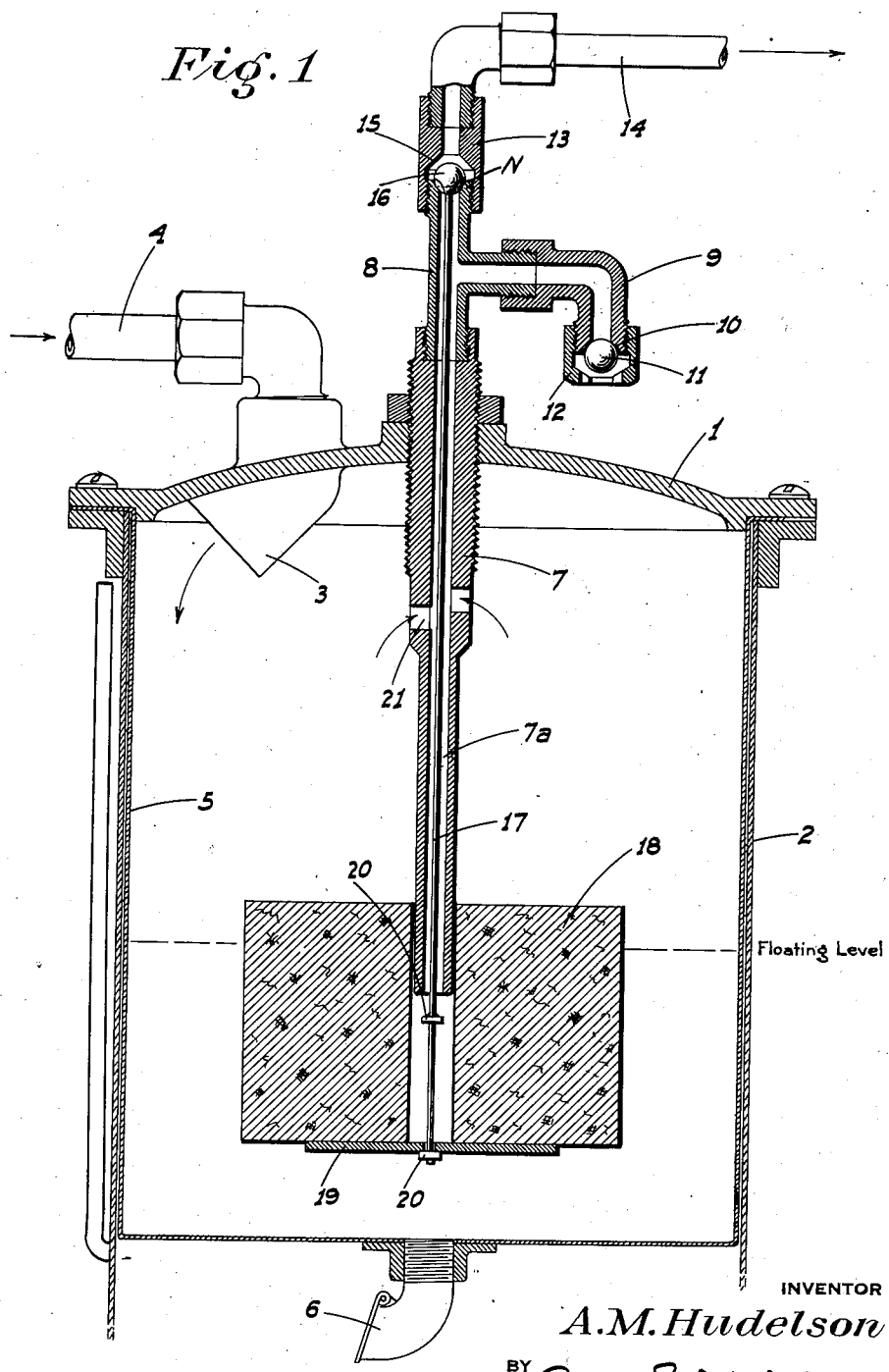

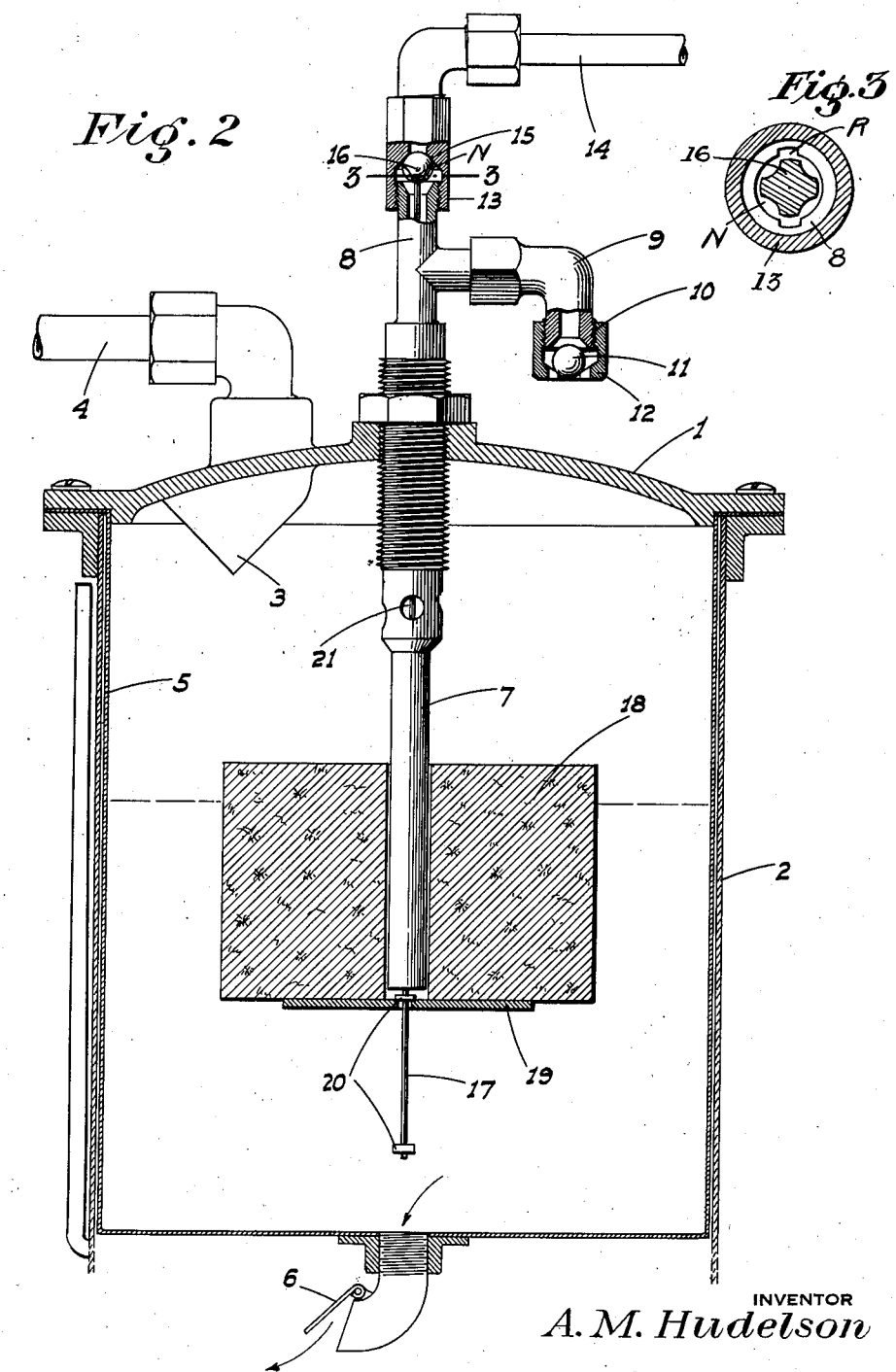

1,989,986

UNITED STATES PATENT OFFICE 1,989,986

CONTROL VALVE FOR FUEL FEEDING DEVICES

Arthur M. Hudelson, Hickman, Calif.

Application October 14, 1933, Serial No. 693,623

5 Claims. (Cl. 103—236)

This invention relates to vacuum tanks such as are used with gas engines to draw fuel by the vacuum of the engine from the relatively low main tank to the higher reservoir of the vacuum tank.

In vacuum tanks as they are now constructed the fuel flow control mechanism is of a relatively delicate nature and is so arranged that the needle valves which form a part of such mechanism are subjected to rapid wear, and they then fail to seat properly resulting in a faulty operation of the vacuum tank. This is especially true with tanks installed on tractors with whose operation the consumption of fuel is so rapid that the tank mechanism is practically in constant operation. When such wear occurs the head of the tank and the mechanism as a unit must then be replaced at a considerable cost.

Also when the vacuum tank is used in connection with the relatively small engines such as are found in ordinary automobiles, the sudden cessation of operation of the vacuum pressure incident to the operation of these present mechanisms, disturbs the smooth operation of the engine and tends to make the same fluctuate. This is especially noticeable when the engine is idling and often results in the stopping of the same.

The principal object of my invention is to avoid the above defective and objectionable features of vacuum tank mechanism as now constructed by providing a float controlled valve mechanism for the fuel passage, and a vacuum and gravity operated valve for the atmospheric passage, so arranged that the usual needle valves are replaced by ball valves having long wearing qualities, and the sudden operation now had either when the tank is full or empty is eliminated. A more gradual suctional pull is provided and engine fluctuations due to a sudden disturbing to vacuum conditions in the engine by reason of the operation of the tank mechanism are avoided.

A further object is to provide a mechanism of this character in which, if any valve or its co-operating part should wear out, such part may be easily replaced at a slight cost without having to replace the entire structure so that the upkeep costs to the owner are greatly reduced.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a sectional elevation of the upper portion of a vacuum tank with my improved float control mechanism mounted therein and showing the parts in the position occupied when the tank is empty.

Fig. 2 is a similar view but with the tank filled and the vacuum shut off.

Fig. 3 is an enlarged cross section on the line 3—3 of Fig. 2.

Referring now more particularly to the characters of reference on the drawings, the numeral 1 denotes the head cap of the usual type of vacuum tank 2. Said cap has, as is customary, an inlet passage 3 adapted for connection outside the cap to the supply conduit 4 leading from the main fuel tank. The tank is divided into upper and lower chambers by an upper vessel 5 depending into the tank and supported at the top, said vessel having a discharge valve 6 in its bottom of common character. The passage of air from atmosphere into the upper chamber is controlled while the lower chamber is constantly open to the atmosphere as indicated. When the upper vessel or chamber is full and air is admitted to the same, the valve 6 opens automatically and discharges the contents of the upper chamber into the lower chamber in the usual manner. Thus far the parts I have described are all standard and I do not change the same in any way.

My improved mechanism for controlling the flow to the upper chamber by the vacuum of the engine comprises a vertical stem 7 projecting into the vessel 5 and mounted in the cap 1, said stem having a passage 7a from end to end. Secured on the upper end of the stem is a T fitting 8 on the lateral portion of which a downwardly facing elbow 9 is mounted, said elbow having a valve seat 10 on its lower end. A ball valve 11 is provided to engage said seat, being confined by a cage nut 12 which permits a limited downward movement of the ball away from its seat and allows air to flow past the ball when the latter is supported by the cage. The members 7 and 8 could actually be made as one single part, but for economy of manufacture it is preferable to make them separate.

Screwed on the upper end of the T is a tubular coupling 13 by which connection with the vacuum conduit 14 leading from the engine manifold is made. The coupling is provided with an internal downwardly facing seat 15 for a ball valve 16, which is capable of limited vertical movement between the seat and the top of the T. Said valve is arranged so that when supported on the fitting air may freely pass from the passage 7a to the coupling and the conduit 14.

This may be accomplished by notching the lower part of the ball 16 as shown at N, and/or by similarly recessing the upper end of the T fitting on which the ball is supported when in its lowest position, as shown at R in Figure 3.

The ball valve 16 is mounted on a relatively small rod or stem 17 which projects through the passage 7a and beyond the bottom of the stem 7. A cylindrical float 18 preferably of cork is slidably guided on the lower portion of the stem 7. On the bottom the float is provided with a cross member 19 through which the valve stem 17 freely projects, said stem being provided with a pair of vertically spaced stops 20 both of which are below the stem 7 and which are above and below the plate 19 to engage the same. The float may therefore move vertically a distance equal to the spacing between the stops before any movement is imparted to the valve stem. Relatively large holes 21 above the highest level of the liquid or float provide communication between the outside of the stem 7 and the interior passage 7a.

In operation as the liquid drains out from the upper vessel 5 until it is empty, as in Fig. 1, the float moves down on the stem 7 until it becomes unsupported by the liquid and rests on the lower stop 20. The weight of the float then pulls down on the valve stem 17, drawing the valve 16 from seated engagement with the seat 15 and causing the same to rest on top of the fitting 8. Up to this time the valve 11 is in its lowest position, resting on the cage 12 and allowing air to flow into the upper vessel 5 to replace the liquid being drained out, since such air can freely flow past said valve 11 through the elbow 9 and fitting 8 and down into the tank chamber through the passage 7a and openings 21.

As soon as the valve 16 is drawn clear of the seat 15 the vacuum pressure in the conduit 14 instantly acts to exhaust the air from the upper tank chamber and the atmospheric pressure acting against the ball 11 instantly forces the same to a seating position, as shown in Fig. 1. The liquid then flows into the tank from the conduit 4 as usual. After the liquid has risen in the tank a certain distance it supports the float which moves up the stem 17 without imparting movement thereto until it engages the upper stop 20. A further raising of the float then raises the valve stem and valve causing the latter to be forced against the seat 15, as shown in Fig. 2. The vacuum pull being thus relieved from the valve 11, the latter drops of its own weight to an open position causing air to flow into the upper chamber and allowing the liquid to drain from said upper chamber into the lower one as stated at the outset.

In order to insure that the downward movement of the naturally light float will cause the valve 16 to be initially pulled to an open position against the vacuum pressure tending to hold the same closed, the float is weighted somewhat in a suitable manner. In the present disclosure this is done by means of the member 19 on the float which thus serves a double purpose. The holes 21 in the side of the member 7 are important in that they provide an air inlet to the tank chamber above the level of the liquid and thus prevent any liquid from possibly being drawn up through the passage 7a from the bottom thereof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A vacuum tank flow control mechanism comprising a rigid tubular unit adapted to be mounted in the head of and to depend into the tank, means to connect the upper end of the unit with a vacuum conduit, a vertically movable upwardly closing valve in the unit above the tank, a passage member open to atmosphere connected to the unit above the tank and below the valve, a valve in said member opening away from the unit, a float within the tank and surrounding the unit in guiding relation therewith, and means between the first named valve and the float and cooperating with but disconnected from said float to move the said valve to a closed position only when the tank becomes full and the float rises and to move the valve to an open position only when the tank becomes empty and the float drops.

2. A vacuum tank flow control mechanism comprising a tubular unit adapted to be mounted in the head of and to depend into the tank, means to connect the upper end of the unit with a vacuum conduit, a vertically movable upwardly closing valve in the unit above the tank, a passage member open to atmosphere connected to the unit above the tank and below the valve, a valve in said member opening away from the unit, a float slidably guided on the unit in position to be within the tank, a rigid valve stem connected to the first named valve and depending thence freely through the unit to a point below the same, and means betwen the bottom of the float and the portion of the stem below the unit for moving the stem longitudinally in one direction or the other with relatively greater movements of the float in corresponding directions.

3. A structure as in claim 2, with a stop formed in the unit and limiting the downward opening movement of the first named valve.

4. A vacuum tank flow control mechanism comprising a passage unit mounted on and depending into the tank and opening into the same, means to connect the upper end of the unit with a vacuum conduit, an upwardly closing valve in said unit, a passage member open to atmosphere connected to the unit below the valve, a valve in said member opening away from the unit, a float in the tank, connection means between the float and first named valve to open and close the latter with the fall and rise respectively of the float, and means independent of said connection means slidably engaging and guiding the float in its vertical movement.

5. A vacuum tank flow control mechanism comprising a vessel, a cap on the vessel provided with an inlet for connection with a fuel supply and an outlet, a vertical stem projecting into the vessel and provided with a passage from end to end, said passage being arranged at its outer end for connection with a suction conduit, a valve controlling such connection, means to admit atmosphere pressure into the passage when the valve is closed, a relatively small stem on the valve extending freely through the passage to allow air movement through such passage, a float loosely mounted on the lower end of the valve stem, the float having a central orifice, the first named stem projecting into the orifice with a running fit therein whereby to positively guide the vertical movements of the float and prevent lateral movement of the float relative to the valve stem and means on the valve stem engageable by but disconnected from the float to open or close the valve respectively as the float moves downwardly or upwardly.

ARTHUR M. HUDELSON.